(12) United States Patent
Farr et al.

(10) Patent No.: US 6,956,643 B2
(45) Date of Patent: Oct. 18, 2005

(54) APPARATUS AND METHOD FOR TESTING OPTICAL TRANSCEIVERS

(75) Inventors: Mina Farr, Palo Alto, CA (US); Robert Fuhrmann, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 5 days.

(21) Appl. No.: 10/677,607

(22) Filed: Oct. 2, 2003

(65) Prior Publication Data

US 2004/0085528 A1 May 6, 2004

Related U.S. Application Data

(60) Provisional application No. 60/422,239, filed on Oct. 30, 2002.

(51) Int. Cl.$^7$ ............................................. G01N 21/00
(52) U.S. Cl. ..................................................... 356/73.1
(58) Field of Search ................ 356/73.1; 439/352–355; 385/56, 59, 76–78, 86–88

(56) References Cited

U.S. PATENT DOCUMENTS

| 4,753,510 A | * | 6/1988 | Sezerman .................... 385/61 |
| 6,238,104 B1 | * | 5/2001 | Yamakawa et al. ........... 385/87 |
| 6,632,102 B1 | * | 10/2003 | Gherardini ................... 439/352 |
| 6,776,533 B2 | * | 8/2004 | Gherardini ................... 385/59 |

* cited by examiner

*Primary Examiner*—Tu T. Nguyen
(74) *Attorney, Agent, or Firm*—Workman Nydegger

(57) ABSTRACT

Systems, apparatus and methods for testing the optical quality of optical transceivers or ports. A port tester is provided that is used to quantitatively measure the optical quality of ports. A port is inserted in the port tester between a mirror assembly and a fiber assembly. A mirror included in the mirror assembly is positioned in or near a focal plane of the port lens. A test light signal is directed through the port from the optical fiber and is reflected back through the port by the mirror. The power of the reflected test signal is compared to a control signal and the comparison between these signals is indicative of the optical quality of the port. The fiber assembly is retractable such that a new port can be mounted in the port tester and tested.

15 Claims, 4 Drawing Sheets

APPARATUS AND METHOD FOR TESTING OPTICAL TRANSCEIVERS

CROSS-REFERENCE TO RELATED APPLICATIONS

This application claims the benefit of U.S. Provisional Application No. 60/422,239, filed Oct. 30, 2002 and entitled APPARATUS AND METHOD FOR TESTING OPTICAL TRANSCEIVERS, which is hereby incorporated by reference.

BACKGROUND OF THE INVENTION

1. The Field of the Invention

The present invention relates to systems, apparatus and methods for testing optical transceivers. More particularly, the present invention relates to apparatus and methods for testing small form factor optical transceivers with optical components that are an integral part of the optical transceivers.

2. Background and Relevant Art

Fiber optic networks often include a transmission side and a receiver side. On the transmission side, it is important that the light be efficiently coupled into the transmission fiber in order to achieve adequate transmission power with minimum laser output strength. On the receiver side, it is important to efficiently image the fiber output onto detectors with adequate margin for error. This is particularly true as the size of detectors decreases, often for cost reasons.

Effective coupling of the light into the optical fiber on the transmission side and effective coupling of the optical fiber output to a detector is often achieved through the use of small form factor optical transceivers or miniature ports that house small optical elements. These optical transceivers or ports are highly desirable because they are small. In addition, these optical transceivers incorporate or integrate two or more optical components into a common assembly. The common assembly, especially when the coupling or lens element is simply molded as an integral part of the port, simplifies manufacturing processes and reduces cost. Further cost reduction can also be achieved by molding the coupling lens and the mechanical port as a single unit.

The lens or coupling elements of the optical transceivers are often pressed or glued within the optical transceiver or are molded as an integral part of the transceiver. In spite of the advantages afforded by these small the small size and the embedded position of the optical components, the size of the optical transceiver can also present several problems. The optical quality of the lens that is embedded in the port of the optical transceiver, for instance, is dependent on the surface accuracy, surface and volume material quality, and positional accuracy of the lens with respect to the body of the port.

Deviations of the surface curvature of the integrated lens from the design curvature of the integrated lens, due to the molding process or pressing of the molded lens element into the housing of the optical transceiver, can introduce errors and aberrations into an optical system. Other surface and volume degradations such as scratches, digs, and bubbles introduced in the molding process or as a result of placement and fixing of the molded lens element inside the port also reduce the optical efficiency of the coupling element in an optical system. The combined effect of these and other errors lessen the overall quality of a particular optical transceiver.

These types of errors are usually detected or measured using interferometric optical surface measurements. A mechanical profiler, for example, may be used to detect some of these errors. In small form factor optical transceivers, however, it is difficult and cumbersome to use standard optical equipment to perform the usual optical surface measurements because of the small geometry of the optical transceiver. In particular, the embedded nature of the lens in the optical transceiver makes a traditional analysis of the lens element impractical and costly.

BRIEF SUMMARY OF THE INVENTION

These and other limitations are overcome by the present invention which is directed to measuring the efficiency or quality of a lens element inside the optical transceiver or port. The present invention produces a quantitative measure of various lens degradations without specifically identifying the particular degradation that has led to the reduced optical quality of small form factor optical transceivers. This is particularly true of optical transceivers where the lens is an integral part of the transceiver. In one example, the optical and mechanical elements of the optical transceiver are molded from a material such as plastic.

The present invention further relates to an optical port tester that can be used to generate a quantitative measurement of the optical quality of the lens of port in an efficient manner. The port tester includes a mirror assembly that includes a mirror or other reflective element. The port tester also has a fiber assembly that holds an optical fiber cable used in testing the port. The port is connected with the optical fiber held in the fiber assembly and the port and the fiber assembly are jointly slid towards the mirror assembly until the port is connected with the mirror assembly and the fiber.

After the port is securely mounted in the port tester, an optical light signal is directed into the fiber to the port. Half of the light or a control portion of the light signal is directed to a power meter to provide a control measurement of the power of the light signal. The other half of the input light or test portion of the light signal goes through the port and is then redirected or reflected back through the port by the mirror included in the mirror assembly. The power of the test portion of the light signal returning through the port is measured and compared to the power measurement of the control portion of the input light signal. This comparison provides an indication of the quality of the port or the lens without identifying a particular degradation.

The mirror assembly is also connected with a micrometer that can adjust the position of the mirror with respect to the lens of the port in order to correctly position the mirror at the conjugate position from the optical fiber facet. The conjugate position from the optical fiber is the same as the laser position in a transmitter port, or the detector position in a receiver port. This further provides the ability to determine if the lens is within the focal specification of the lens of the port being tested.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Small form factor optical transceivers that contain small optical elements are preferred in optical communication networks for their small size, their low cost, and the integrated nature of the optical port design. In particular, these optical transceivers are able to incorporate small lenses that are used, for example, to couple laser or source light into transmission fibers (a transmitter optical port), as well as image the output of an optical fiber onto a detector (a receiver optical port).

Efficient coupling of a source light into an optical transmission fiber achieves adequate transmission power with minimum source strength. Furthermore, it becomes increasingly important to efficiently image the output of a fiber onto a detector as the physical size of the detector decreases. As previously stated, the small size of the optical transceivers, the embedded nature of the optical elements, the difficulty in measuring the optical quality of the embedded lens, and the like, make testing the optical quality of these types of optical transceivers difficult if not impractical.

The present invention relates to systems and methods for testing optical transceivers with integrated optical and/or mechanical elements. Each optical transceiver or port is mounted in a port tester and a source light is directed through the port. A mirror redirects the light back through the port to a power meter. The overall quality of the port can be quantified or qualified by comparing the input power of the source light signal to the output power of the light signal after the light signal has passed through the port.

Figure 1:
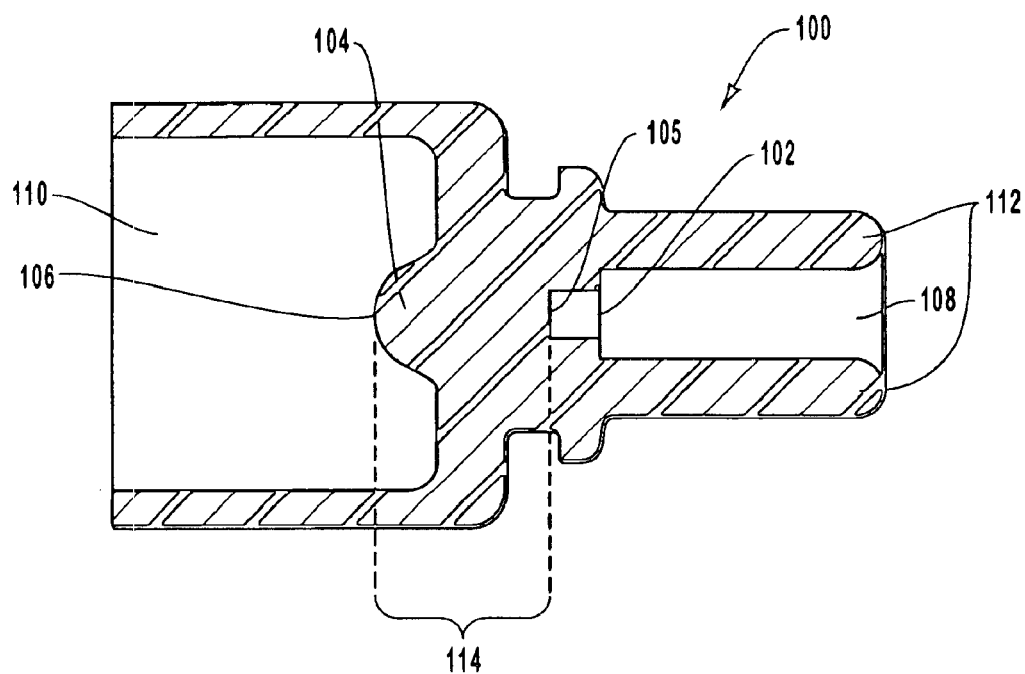
FIG. 1 illustrates a cross sectional view of an exemplary port and illustrates the embedded nature of the lens element of the port.

FIG. 1 is a cross sectional view of an exemplary small form factor optical transceiver or port. The port 100 in this example is molded from plastic and incorporates a lens 104 as an integral part of the port 100. The design of the port 100 produces a lens surface 106 and the lens 104 has a thickness 114. The optical power of the lens 104 is located in the lens surface 106 as the other lens surface 105 is substantially flat. The lens 104 and lens surface 106 are embedded inside of the lens access 110 of the port 100. As previously described, the embedded nature of the lens 104 and lens surface 106 within the lens access 110 of the port 100 makes it difficult to test the optical quality of the lens 104 and the lens surface 106.

The port 100 can be connected or coupled with an optical fiber through the fiber access 108 which is formed by the fiber guide 112. A fiber stop 102 is formed or molded in the port 100 to ensure that the fiber is not inserted in the port 100 too far and that light will couple with the fiber. The fiber stop 102 also ensures that the end of an optical fiber that is inserted in the fiber access 108 is at the designed laser conjugate position from the lens 104 to ensure that the light is effectively coupled from the laser into the transmission fiber by the port 100.

As previously mentioned, lens surface and volume degradations such as scratches, digs, and bubbles, when present, all reduce the optical efficiency and quality of the lens 104 of the port 100. The present invention relates to a system, apparatus and method for quantitatively testing an optical transceiver such as the optical port 100 illustrated in FIG. 1. It is understood that the port 100 illustrated in FIG. 1 is exemplary in nature and that the present invention extends to ports or optical transceivers of other shapes and lens configurations. The port 100, for example, may be a receiver port that is configured to image light on a detector instead of on an optical fiber. The port 100 may be a transmitter port that couples light from a light source with an optical fiber.

Figure 2:
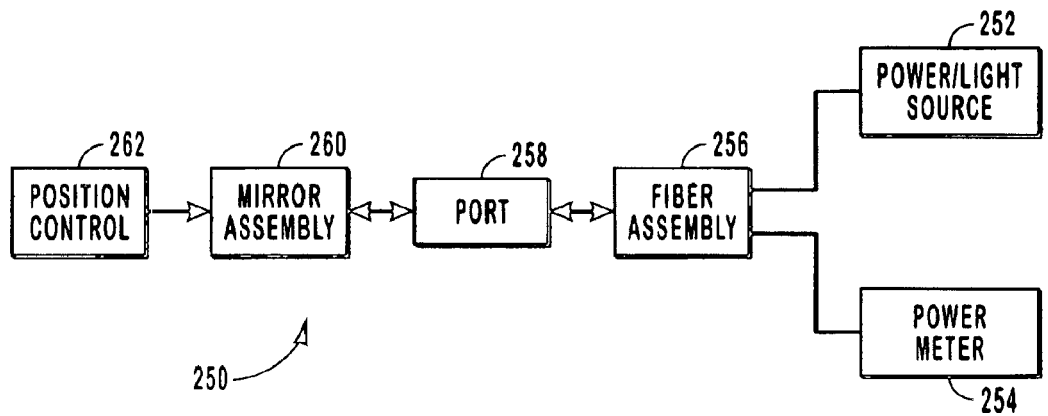
FIG. 2 is a block diagram that illustrates a system for testing the optical quality of a port.

FIG. 2 is a block diagram that illustrates an exemplary port testing system. A port 258, which may be a transmitter port, a receiver port or other port is inserted in the testing system 250 between the mirror assembly 260 and the fiber assembly 256. The port 258 is connected with an optical fiber that is secured in a fiber assembly 256. The mirror assembly 260 is connected on the other side of the port 258. The mirror assembly 260 typically positions a mirror or other reflecting surface where a light source or optical signal source would otherwise be positioned with respect to the lens element of the port 258. The position control 262, in combination with a resilient member included in the mirror assembly 260, exerts a force on the mirror assembly 260 that enables the mirror included in the mirror assembly 260 to be finely positioned with respect to the lens element of the port 258.

After the port 258 is inserted in the testing system 250, a power or light source 252 is used to direct a light or optical signal into the optical fiber supported by the fiber assembly 256 and through the port 258. The mirror assembly 260 reflects the light back through the port 258 where the power of the light signal that has passed through the port 258 twice is measured by the power meter 254. The power reading displayed by the power meter 254 of the reflected light signal is compared with the power of the signal produced by the light source 252 to the port at the fiber position. This comparison produces a quantitative measurement of the quality of the port 258 or of the lens molded into the port 258. This is more fully described with reference to FIG. 6 below.

Figure 3:
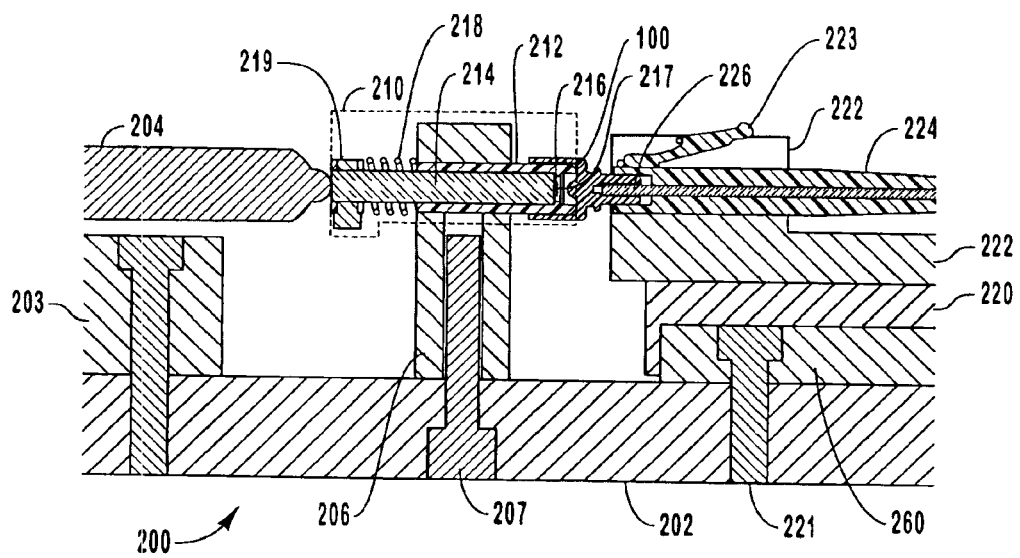
FIG. 3 is a cross sectional view of a port that is mounted in a port tester and illustrates the mirror assembly and the fiber mount of the port tester.

FIG. 3 is a cross sectional view of an exemplary port tester 200. The port tester 200 includes a base 202 that connects with a mirror mount 206 and a fiber mount 220. The mirror mount 206 and the fiber mount 220, for example, may be bolted to the base 202 with bolts 207 and 221 respectively, or otherwise connected with the base 202. The mirror mount 206 holds or supports a mirror assembly 210 that is used to position a mirror 217 that reflects the test light back through the port 100. The mirror assembly 210 includes an inner mirror guide 214 that is positioned within an outer mirror guide 212. In this example, the outer mirror guide 212 is firmly or securely connected to the mirror mount 206 such that the inner mirror guide 214 can be laterally repositioned within the outer mirror guide 212.

One end of the outer mirror guide 212 is positioned or inserted within the lens access of the port 100. The actual shape of the end of the outer mirror guide 212 can be varied to accommodate ports of different sizes and shapes. A mirror 217 is attached or connected at a test end 216 of the inner mirror guide 214 and the position of the inner mirror guide 214 can be adjusted within the outer mirror guide 212 by the position control 204, which may be a micrometer for example. The position control 204 is held by a position control mount 203, which is bolted or otherwise connected to the base 202 of the port tester 200.

A spring 218 or similar resilient member is included in the mirror assembly 210. One end of the spring 218 pushes against the outer mirror guide 212 or the mirror mount 206. The other end pushes against a lip 219 of the inner mirror guide 214. The spring 218 exerts a force against both the position control 204 and the mirror mount 206, thus ensuring that the location or position of the mirror 217 is fixed for each port 100 being tested. In other words, the spring 218 enables the position control 204 to finely position the mirror 217 laterally with respect to the lens element of the port 100 because the port 100 is connected to the end of the outer mirror guide 212 and the inner mirror guide 214 can be repositioned within the outer mirror guide 212.

After the port 100 is positioned on the end of the outer mirror guide 212, the position control 204 permits the mirror 217 to be positioned in or near the focal plane of the lens of the port 100 by either pushing the inner mirror guide 214 towards the lens of the port 100 or by allowing the spring 218 to push the inner mirror guide 214 away from the lens of the port 100. The position control 204 thus enables the position of the mirror 217 to be adjusted as needed from one test position to a new test position relative to the port lens.

More particularly, the position control 204 can push the mirror 217 towards the lens of the port, which compresses the spring 218. When the position control 204 is retracted, the mirror 217 moves away from the lens of the port because the spring 218 is pushing against the lip 219 of the inner mirror guide 214 as the position control 204 is retracted. An advantage of the position control 204 is that the mirror 217 can be repositioned until the power of the light reflected back through the port 100 is maximized. This can determine if the focal length of the lens of the port 100 is within the specifications of the port 100.

The port tester 200 also includes the fiber mount 220, which is connected to the base 202 by a bolt or other connector. The fiber assembly 222 is connected with the fiber mount 220 in a manner that permits the fiber assembly 222 to be moved or slid from a connected position to a retracted position. The fiber assembly 222 is in a connected position after being slid towards the mirror assembly 210 and in a retracted position after being slid away from the mirror assembly 210. The fiber assembly is latched into a connected position using the latch 260. Thus, the fiber assembly 222 can be slid towards or retracted from the mirror assembly 210 on the fiber mount 220. As shown and discussed with reference to FIG. 5, the fiber assembly can be latched in a connected position with the latch 260.

After a port is mounted on the optical fiber 224 that is secured by the fiber assembly 222, the fiber assembly 222 is slid or moved towards the mirror assembly 210 until the port 100 is connected with the mirror assembly 210 and the fiber assembly 222 is latched or locked into the connected position. Because the fiber assembly 222 is slidably mounted to the fiber mount 220, a port can be quickly mounted in the port tester or on the optical fiber 224 when the fiber assembly 222 is in a retracted position. More generally, the port to be tested is either mounted on the test end of the outer mirror guide or on the optical fiber and then the fiber assembly is slid into the connected position as described above.

In other words, a person places a port 100 on the outer mirror guide 212 or the fiber assembly 222 and then slides the fiber assembly 222 towards the mirror assembly 210 until the port is firmly connected with both the optical fiber held in the fiber assembly 222 and the mirror assembly 210. The optical fiber 226 should be against the fiber stop of the port 100 for testing purposes. In addition, the fiber assembly 222 can be pushed against the port 100 and held in place by the latch 260 and by the spring force from the fiber optic connector 223 to ensure that the port 100 has a tight or firm fit with both the optical fiber 226 and the outer mirror guide 212 of the mirror assembly 210.

The fiber assembly 222 holds a fiber cable 224. The fiber cable 224 is connected with the fiber guide of the port 100 and the optical fiber 226 within the fiber cable 224 is inserted in the fiber access of the port 100. The fiber stop of the port 100 ensures that the end of the optical fiber is in or near the focal plane of the lens of the port 100 as previously described. After the fiber mount 220 has been latched in place, the optical quality of the port 100 can be determined.

Figure 4:
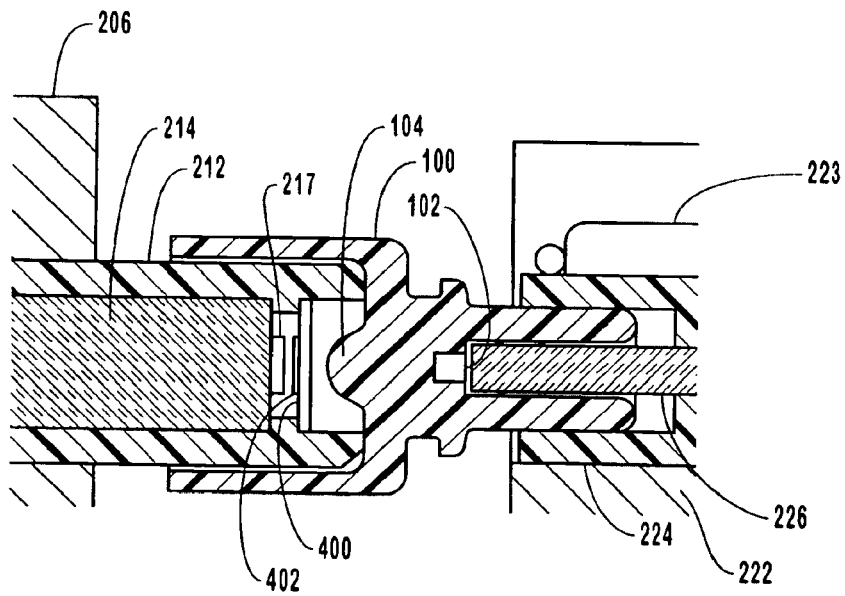
FIG. 4 is a cross sectional view of a port that is mounted on the outer mirror guide of a mirror assembly and connected with an optical fiber.

FIG. 4 is a block diagram that illustrates a port that is securely inserted or mounted in the port tester. FIG. 4 focuses on the connection of the port 100 with the mirror assembly 210 and the fiber assembly 222. In FIG. 4, the outer mirror guide 212 is inserted in the lens access of the port 100. The mirror 217 that is mounted to the inner mirror guide 214 is positioned in or near the focal plane of the lens 104 using the position control. A glass plate 400 may be inserted between the mirror 217 and the lens 104 to simulate the proper optical path. A wavelength plate 402 is also mounted next to the glass plate 400 to limit the light reflected back through the lens 104 of the port 100 to a particular wavelength. The glass plate 400 and the wavelength plate 402, for example, may be mounted to an end of the outer mirror guide 212. The port 100, however, can be tested even if the glass plate 400 and the wavelength plate 402 are not present.

The fiber assembly 222 shown in FIG. 4 securely holds the fiber cable 224, although the fiber assembly 222 includes a fiber optic connector 223 that permits the fiber cable 224 to be removed from the fiber assembly 222. The optical fiber 226 of the fiber cable 224 is inserted in the fiber access of the port 100 up to the fiber stop 102. Thus, the end of the optical fiber 226 is also positioned in or near the conjugate position of the lens 104. To remove the port 100 from the port tester, the fiber assembly is retracted from the port 100 and the port can be manually removed from the port tester by pulling it off of the outer mirror guide 212. Alternatively, the port can be removed from the fiber cable 224. Alternatively, this process can be automated.

Figure 5:
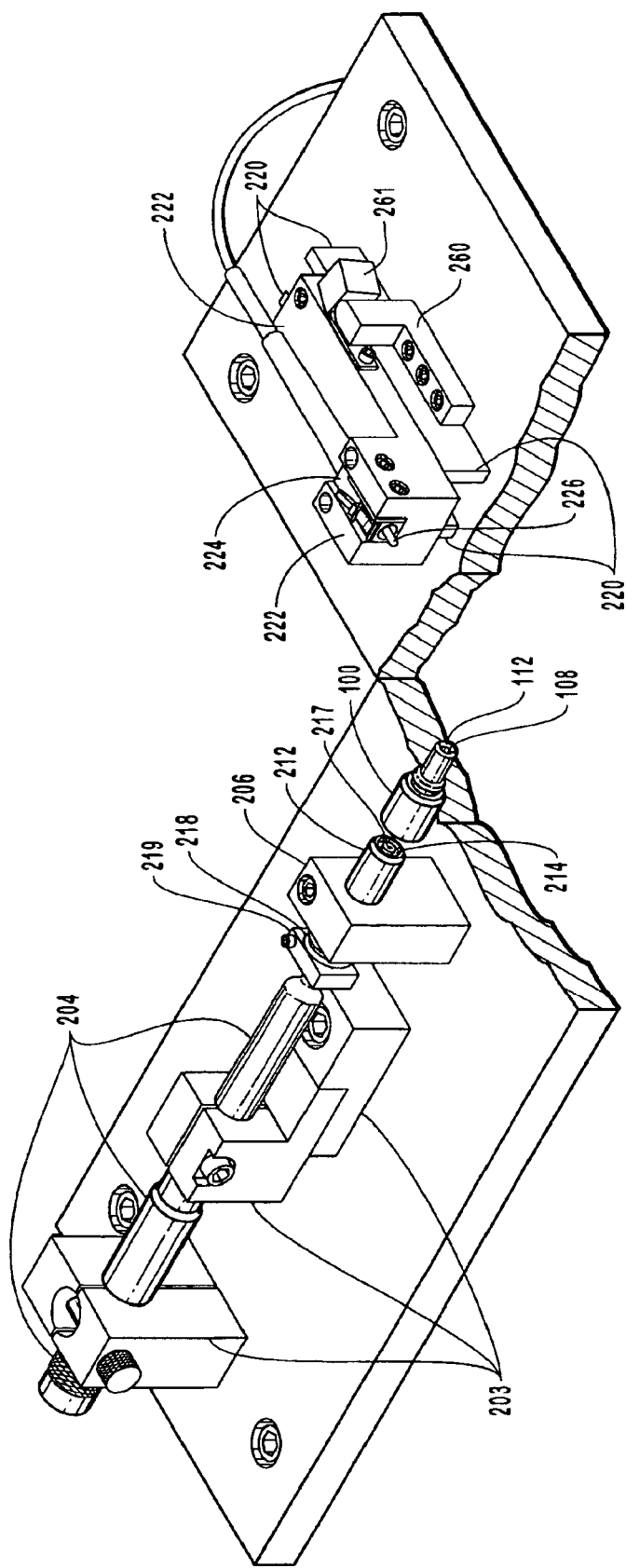
FIG. 5 is an expanded perspective view of a port that is being mounted on the port tester.

FIG. 5 is an expanded perspective view of a port tester and further illustrates the mirror assembly, the position control, and the fiber assembly. The outer mirror guide 212 is shown secured in the mirror mount 206 and is, in one example, an integral part of the mirror mount 206. However, the position control 204, the mirror assembly and the fiber assembly can be removed and replaced in the port tester as required in one example. The inner mirror guide is positioned within the outer mirror guide 212 and can be laterally repositioned with respect to the outer mirror guide 212 as previously described by the position control 204. The mirror 217 is connected to a test end of inner mirror guide 214 (the glass window and the wavelength plate shown in FIG. 4 are not shown in FIG. 5). The port 100 is placed on the optical fiber 226 held in the fiber assembly 222. The fiber assembly is then moved towards the outer mirror guide 212 until the lens access of the port 100 is firmly mounted on the outer mirror guide 212.

After the port 100 is mounted in the port tester, the mirror 217 can be adjusted (by positioning the inner mirror guide 214 with the position control 204) with respect to the lens of the port 100. The spring 218, which exerts a force against the position control by pushing against the lip 219, ensures that the mirror 217 is held in a constant position as the port 100 is tested.

The fiber assembly 222 is slidably mounted on the fiber mount 220 and the fiber assembly 222 holds a fiber cable 224. To connect the port 100 with the fiber cable 224, the optic fiber 226 is inserted in the fiber access 108 of the port 100. The fiber guide 112 is inserted in the fiber cable 224. The fiber guide 112 thus detachably connects the port 100 with the fiber cable 224 and ensures that the optic fiber 226 is properly positioned within the fiber access as previously described. The fiber assembly 222 is slidably connected with the fiber mount 220 such that ports can be tested in succession. When the fiber mount 220 is retracted, the current port is removed from the mirror assembly or from the optical fiber and a new port is placed on the mirror assembly or on the optical fiber. After the new port is placed on the mirror assembly or the optical fiber, the fiber mount 220 is slid to a connected position until it latches into place and the port can be tested., When the fiber assembly 222 is slid forward to a connected position and the port 100 is securely mounted in the port tester, the fiber assembly 222 is held in the connected position by the latch 260 and the catch 261. The catch 261 is mounted to the fiber assembly 222 with a resilient member that connects with the latch 260. When the catch 261 is connected with the latch 260, the fiber assembly 222 is no longer free to slide along the fiber mount 220. The catch 261 can be depressed to release the catch 261 from the latch 260. After a port 100 has been tested, the catch 261 is released and the fiber assembly 222 is slid back to a retracted position such that a new port can be mounted in the port tester and tested. The catch 261 and the latch 260 ensure that each port is mounted in the port tester in substantially the same position as other ports that are tested in the port tester.

Figure 6:
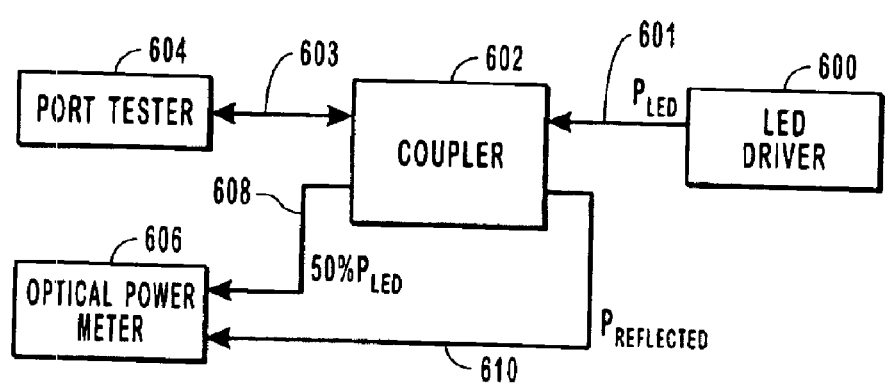
FIG. 6 illustrates a system for testing the optical quality of a port.

FIG. 6 is a block diagram used to describe a method of testing each port that is inserted in the port tester described herein. After a port is inserted in the port tester, a LED driver 600 or other light source generates a light signal 601 that has a certain power ($P_{LED}$). The generated light signal is directed to a coupler 602. The coupler 602 effectively divides the signal into a reference control signal 608 and a test signal 603 and directs the reference control signal 608 with half of the power of the original signal to the optical power meter 606. The other half of the signal 601, shown as test signal 603, is directed to the port tester 604.

At the port tester 604, the test signal 603 or test portion of the light signal 601 exits the fiber and passes through the port being tested. The test signal is reflected by the mirror and passes through the port again where it is focused on the fiber and returned to the coupler 602. The coupler 602 directs the reflected test signal that has been redirected back through the port to the optical power meter 606. The reflected test signal now represents the test portion of the original signal 601 after it has passed through the port being tested (twice in this example). The power of the control signal 608 is compared against the power of the reflected test signal 610 to produce a quantitative measurement of the optical quality of the port being tested.

In addition, the position control of the port tester can be adjusted by a user as the port is being tested until the power reading at the optical power meter 606 of the reflected test signal 610 is maximized. The distance between the mirror and the lens of the port at which the power is maximized can be read from the position control (micrometer) and can identify whether the lens is within the focal specification of the lens. The optical quality of an optical transceiver or port can thus be quickly quantified or qualified without identifying any particular degradation of the transceiver being tested.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical port tester for testing the optical quality of a port, the port tester comprising:
   a base;
   a fiber mount connected to the base, wherein the fiber mount supports a fiber assembly that is configured to securely hold a fiber cable, wherein the fiber assembly is mounted so as to slide along the fiber mount such that the fiber assembly can be latched into a connected position and retracted to a refracted position;
   a mirror mount connected to the base, wherein the mirror mount holds a mirror assembly that includes an outer minor guide that is fixed to the mirror mount and an inner mirror guide that slides within the outer mirror guide, wherein the outer mirror guide is configured to receive the port; and
   a mirror connected to the inner mirror guide, wherein the mirror may be positioned at a test position in order to reflect a light signal through the port when the port is mounted in the port tester between the mirror assembly and a fiber cable held in the fiber assembly.

2. An optical port tester as defined in claim 1, further comprising a position control that is mounted to the base, wherein the position control is able to change a position of the mirror mounted to a test end of the inner mirror guide with respect to the lens of the port.

3. An optical port tester as defined in claim 2, wherein the position control is a micrometer.

4. An optical port tester as defined in claim 1, wherein the mirror assembly further comprises a resilient member that exerts a force against both the outer mirror guide and a position control such that the mirror is held in the test position until the position of the inner mirror guide is adjusted to a new test position by the position control.

5. An optical port tester as defined in claim 4, wherein the resilient member is a spring.

6. An optical port tester as defined in claim 1, wherein the outer mirror guide further comprises a wavelength plate mounted in the end of the outer mirror guide such that the wavelength plate is mounted between the mirror and a port lens.

7. An optical port tester as defined in claim 1, wherein the fiber assembly includes a catch that connects with a latch to secure the fiber assembly in the connected position.

8. An optical port tester as defined in claim 1, wherein the fiber assembly includes a fiber optic connector that secures the fiber cable in the fiber assembly.

9. An optical port tester for testing the optical quality of a lens that is an integral optical element of a port, the port tester comprising:

a base;

a fiber mount connected to the base;

a fiber assembly that is connected with the fiber mount such that the fiber assembly can slide between a connected position and a retracted position, wherein a catch connected to the fiber assembly connects with a latch to secure the fiber assembly in the connected position, wherein the lens of the port is tested when the fiber assembly is in the connected position;

a mirror mount connected to the base;

a mirror assembly mounted in the mirror mount, wherein the mirror assembly comprises:
 an outer mirror guide that is fixed to the mirror mount;
 an inner mirror guide that is slidably positioned within the outer mirror guide, wherein a mirror is connected to a test end of the inner mirror guide; and
 a resilient member that exerts a force on the outer mirror guide and a lip of the inner mirror guide; and a position control that pushes against the lip of the inner mirror guide to balance the force exerted by the resilient member, wherein adjusting the position control moves the mirror to a test position with respect to a lens of a port being tested in the port tester.

10. An optical port tester as defined in claim 9, wherein the fiber assembly hold a fiber cable that is connected with the port being tested in the port tester when the fiber assembly is in the connected position.

11. An optical port tester as defined in claim 10, wherein the position control is a micrometer.

12. An optical port tester as defined in claim 11, wherein the micrometer measures a distance between the mirror and the lens of the port being tested, wherein the micrometer adjusts the distance between the mirror and the lens of the port being tested.

13. An optical port tester as defined in claim 9, wherein the outer mirror guide further comprises a wavelength plate and a glass plate mounted in an end of the outer mirror guide such that the wavelength plate and the glass plate are between the mirror and the lens of the port being tested.

14. An optical port tester as defined in claim 9, wherein the resilient member ensures that the mirror is fixed in the test position until the position control adjusts the mirror to a new test position.

15. An optical port tester as defined in claim 9, wherein the resilient member is a spring.

* * * * *